United States Patent [19]

Matsumoto et al.

[11] Patent Number: 4,668,094

[45] Date of Patent: May 26, 1987

[54] APPARATUS FOR MEASURING THE THREE-DIMENSIONAL SHAPE OF A SOLID OBJECT

[75] Inventors: Goro Matsumoto; Koichi Shimizu; Hiroyuki Fujita, all of Sapporo, Japan

[73] Assignee: Mitsubishi Jidosha Kogyo Kabushiki Kaisha, Tokyo, Japan

[21] Appl. No.: 822,007

[22] Filed: Jan. 24, 1986

[30] Foreign Application Priority Data

Jan. 31, 1985 [JP] Japan .................................. 60-16836

[51] Int. Cl.$^4$ ............................................. G01B 11/24
[52] U.S. Cl. .................................... 356/376; 364/560
[58] Field of Search ................ 356/1, 2, 376; 364/560, 364/562

[56] References Cited

U.S. PATENT DOCUMENTS

| | | | |
|---|---|---|---|
| 3,619,065 | 11/1971 | Agnew ................................ | 356/376 |
| 3,814,521 | 6/1974 | Free .................................... | 356/376 |
| 3,952,150 | 4/1976 | Gerardin et al. ................... | 356/376 |
| 4,175,862 | 11/1979 | DiMatteo et al. .................. | 356/375 |

FOREIGN PATENT DOCUMENTS

| | | |
|---|---|---|
| 157299 | 10/1985 | European Pat. Off. ............. 356/376 |
| 2085165 | 4/1982 | United Kingdom . |
| 2098329 | 11/1982 | United Kingdom . |
| 2102574 | 2/1983 | United Kingdom . |

Primary Examiner—R. A. Rosenberger
Attorney, Agent, or Firm—Hedman, Gibson, Costigan & Hoare

[57] ABSTRACT

A shape measuring apparatus includes a first light source for illuminating a solid object in a proper place through a first slide, a second light source for illuminating the object through a second slide and an observation plane permitting the surface of the object to be observed through a focal point. Each of the first and second slides, contains slit lines. When the first and second light sources are lighted, the slit lines of the first and second slide are projected, in an intersecting pattern, on the surface of the object. A projection grating is formed on the surface of the object and is observed, as a projection grating, in the observation plane. The space coordinates of any one arbitrary point of a grating point array on the projection grating are determined by determining a light beam projecting the grating point after it has left the first light source, determining a light beam projecting the grating point after it has left the second light source, determining a light beam, through the focal point, to permit the grating point corresponding to the projection grating point to be observed in the observation plane and determining the space coordinates of the intersection of at least two of the three light beams. Similarly, the space coordinates of other grating points on the projection grating are sequentially determined, thus measuring the shape of the object.

24 Claims, 31 Drawing Figures

F I G. 12A
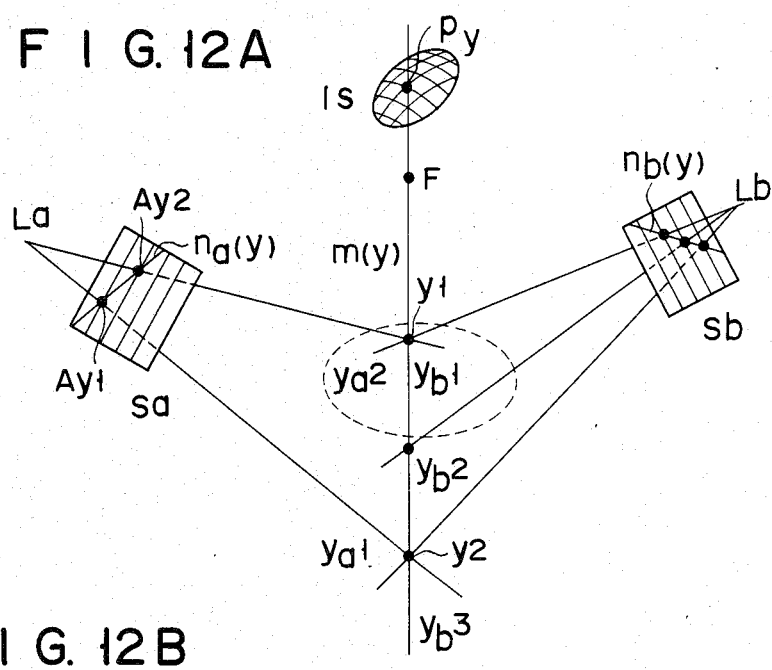
F I G. 12B
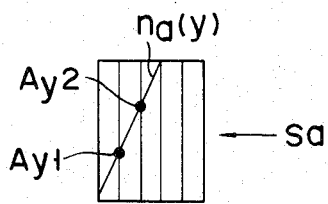
F I G. 12C
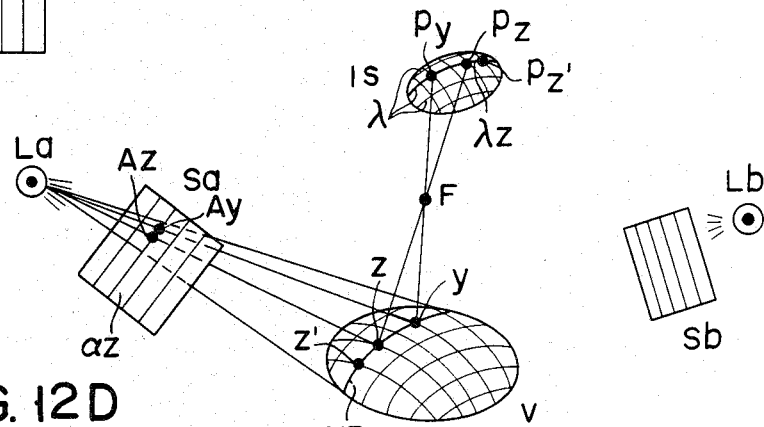
F I G. 12D
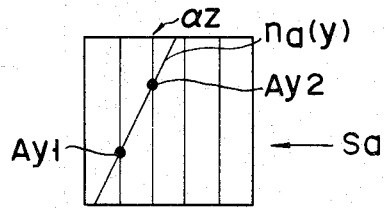

APPARATUS FOR MEASURING THE THREE-DIMENSIONAL SHAPE OF A SOLID OBJECT

BACKGROUND OF THE INVENTION

This invention relates to an apparatus for measuring the three-dimensional shape of a solid object.

A conventional shape measuring apparatus, i.e., a so-called multi-eye type apparatus, is adapted to observe an object from two or more viewing points, to synthesize data (image) obtained from respective observation points and to determine the shape of the object.

A shape measuring apparatus of single-eye type is also known which observes an object from a single viewing point and then determine the shape of the object. However, this apparatus is, even if apparently of the single-eye type, merely based on the use of the "multi-eye" principle. Hence, an object shape measuring apparatus of single-eye type, in a strict sense, is never known in the art.

The conventional measuring apparatus is disadvantageous since the image analysis it performs is very complex. Since the coordinates of the object surface is to be determined with the continuous surface of the object, it is not possible to make such an evaluation due to cracks or sharp pits on the surface of the object to be measured. Neither is it possible to determine the shape of the object unless the measuring apparatus has a better observation accuracy.

SUMMARY OF THE INVENTION

The first object of this invention is to provide a shape measuring apparatus capable of measuring the shape of a solid object by observing it from a single viewing point.

The second object of this invention is to provide a shape measuring apparatus capable of measuring the shape of a solid object, without requiring such a high accuracy as in the conventional measuring apparatus.

The third object of this invention is to provide a shape measuring apparatus capable of measuring the shape of a solid object even if the surface of the object is not smooth, either sharply or irregularly formed.

According to the invention, an apparatus is provided for measuring the outer shape of an object, comprising; an observation device (J) for observing an object (V) whose outer shape is to be determined and two light projectors (A, B) illuminating the surface of the object from two directions.

The light projector A comprises light source (La) and slide (Sa) and the light projector B comprises light source (Lb) and slide (Sb). Each of the slide Sa and Sb has a regular array of slit lines. When light sources La and Lb are lighted, the light beams pass through the respective slit lines and the slit patterns of slides Sa and Sb are projected on the surface of the object V, to form a projection grating (Vs) on the surface of the object V. The projection grating Vs on the surface of the target object V is focused on observation a plane (I) through a focal point (F) of the observation device J. Here, the projection image on the plane I is referred to as an observation grating (Is). With attention paid to any one point (observation grating point p) of the grating point array on the observation grating Is, the coordinates of the one grating point (x) on the projection grating Vs (projection grating point x) corresponding to the observation grating point p are determined as set out below.

First, a straight line (m) containing focal point F and the observation grating point p is obtained. The projection grating point x exists on the line m. Next, two light beams (lax, lbx) are considered which are directed toward the projection grating point x from the light projectors A and B. As mentioned the above, the projection grating point x is located on beam lines lax and lbx. Although equations for the light beam lax and lbx are not given as initial factors, they can be evaluated through the mathematical process of known factors. The mathematical process will appear later and, here, the slit lines on the slides Sa and Sb play an important role. Three straight lines (straight lines m, lax and lbx) are obtained by finding two equations for the light beam lines lax and lbx, noting that projection grating point x is an intersection where the three beam lines meet. Finally, the coordinate of an intersection of at least two of three straight lines (m, lax, lbx) is obtained. Similarly, the coordinates of the other grating points on projection grating Vs are sequentially determined using the grating points on the observation grating Is.

Thus, this method considers the surface of the object V not as a plane, but as a collection of individual points (grating points x). It will be sufficient if the observation device J assures the accuracy with which the grating points x on the object at least can be identified one by one. Since the coordinates of the grating point x on the target object are determined independently, it is possible to measure the surface configurations of all the objects, even if they are sharply or irregularly indented, the case with the irregularly broken projection grating.

BRIEF DESCRIPTION OF THE DRAWINGS

FIGS. 12A, 12B, 12C and 12D are views for explaining the second procedure for measuring the shape of an object with the apparatus of FIG. 1;

DETAILED DESCRIPTION OF THE PREFERRED EMBODIMENTS

Figure 1:
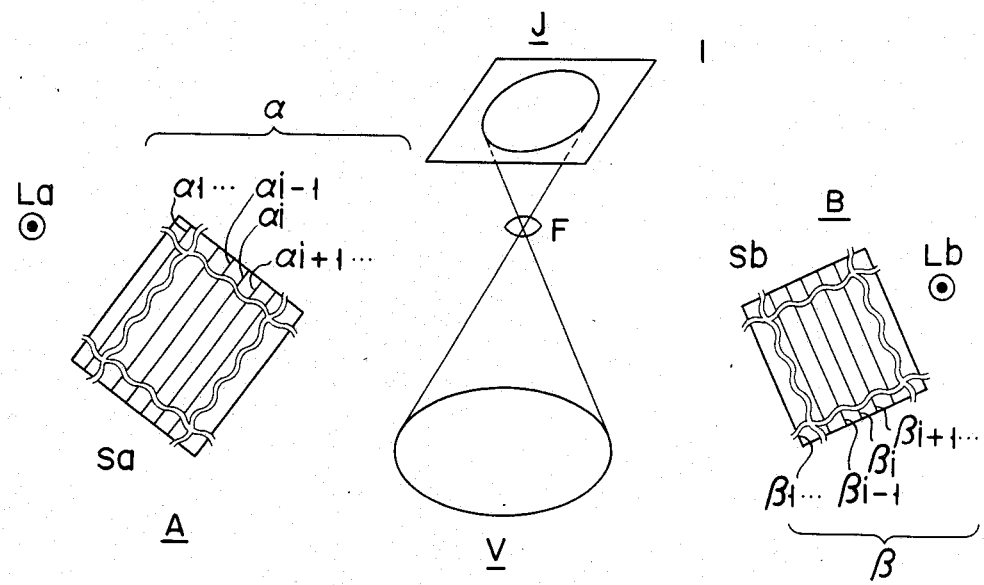
FIGS. 1 and 2, each, show an apparatus for measuring the shape of a solid object.

An embodiment of this invention, as well as the method for measuring the shape of an object using this apparatus, will be explained below with reference to the accompanying drawings:

The Arrangement of the Measuring Apparatus and Setting of Measuring Requirements First, an object V, whose outer shape, i.e., surface configuration, is to be measured, is set as shown in FIG. 1. A slide Sa is located between a light source La and the object V. The slide Sa has slits α regularly arranged as shown in FIG. 1. The slide Sa and the light source La form a light projector A. Then, a light projector B comprising a light source Lb and a slide Sb is similarly arranged. An observation plane I is positioned to permit the object V to be observed through the focal point F. FIG. 1 shows the contour of the object, focused on the observation plane I. An observation device J comprise the focal point F and observation plane I.

Suppose that the space coordinates (x, y, z) an equation of the observation plane I and the focal point F are known. Let it also be supposed that the coordinates of the light sources La and Lb, the space coordinates (equations) of the slides Sa and Sb and space coordinates (equations) of respective straight lines α ($\alpha 1, \ldots \alpha i-1, \alpha i, \alpha i+1, \ldots$) on the slide Sa, and of respective straight lines β ($\beta 1, \ldots \beta i-1, \beta i, \beta i+1, \ldots$) on the slide Sb are all known.

Figure 2:
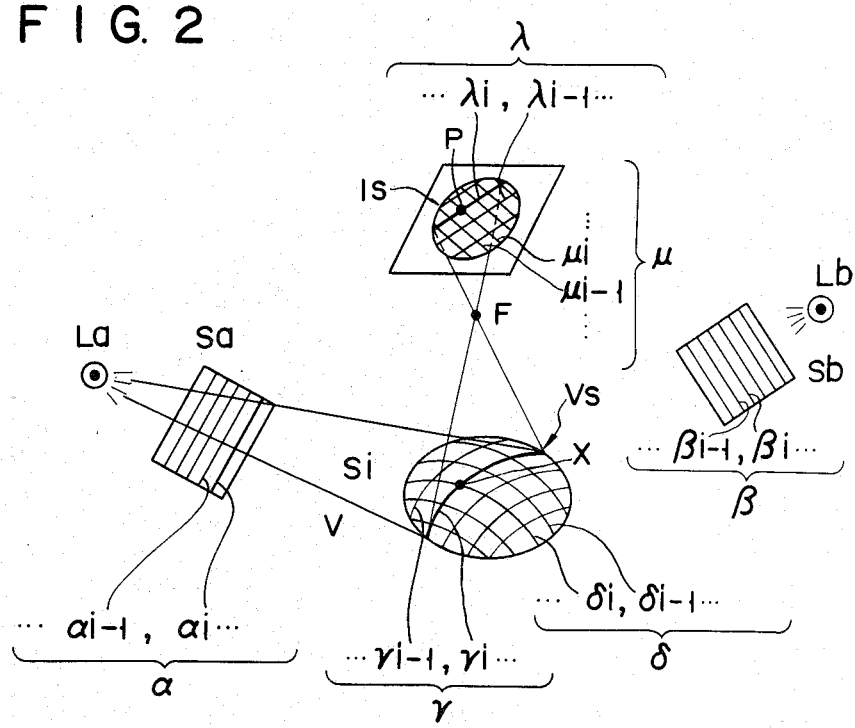

Although a number of slit lines are arranged on slides Sa and Sb as shown in FIG. 2, only some of the slit lines is shown in FIG. 2 et seq.

Light sources La and Lb are lighted, as shown in FIG. 2, with the object V, the light projectors A, B and the observation device J so arranged as set out above. A projection grating Vs is projected on the surface of the object V when the object V is illuminated by the light rays emitted from the light sources through the slits. The slit lines α on the slide Sa are projected as projection lines γ ($\ldots \gamma i-1, \gamma i, \gamma i+1, \ldots$) on the object V, and similarly, the slit lines β on the slide Sb are projected as projection lines δ ($\ldots \delta i-1, \delta i, \delta i+1, \ldots$) on the object V. In this projection grating Vs, a number of grating points given by the crossed projection lines γ and δ form a set X. An observation grating Is corresponding to the projection grating Vs is observed on the observation plane I. The grating Is consists of observation lines λ corresponding to the projection lines γ and observation lines μ corresponding to the projection lines δ. A number of grating points crossed on the observation grating Is form a set P.

In this state, each of the observation grating points P corresponds to a respective specific projection grating point of the observation grating points X.

As shown in FIG. 2, the observation lines λ ($\ldots \lambda i-1, \lambda i, \lambda i+1, \ldots$) correspond to the projection lines γ ($\ldots \gamma i-1, \gamma i, \gamma i+1, \ldots$). Each projection line γ corresponds to a specific one of lines α ($\ldots \alpha i-1, \alpha i, \alpha i+1, \ldots$). In this illustration the slit line αi, the projection line γi and the observation line λi correspond to each other. In this connection, note that a plane Si contains the light source La and the slit line αi, and that the projection line γi of the slit αi is projected onto the object V by the slit light in the plane Si. Such a one-to-one correspondence is also obtained with respect to the slit lines β, the projection lines δ and the observation lines μ. At this stage, however, it is unknown which respective observation lines λ and μ in the observation grating Is correspond to which respective slit lines α and β.

In this way, the parts of the apparatus of this invention are arranged so as to measure the three-dimensional shape of the object V.

Basic Procedure I

Figure 3:
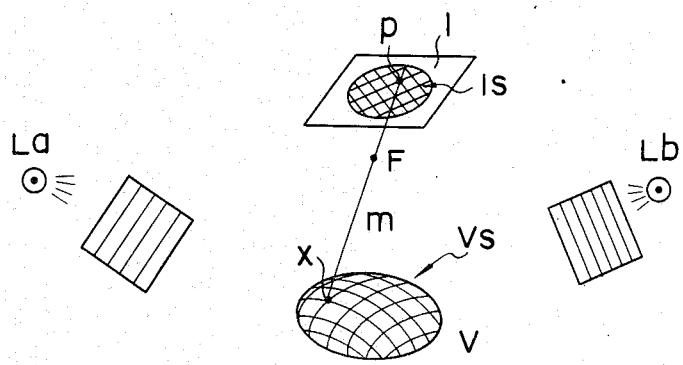
FIGS. 3, 4, 7A, 7B, 8, 9A, 9B, 10 and 11 are views for explaining the first procedure for measuring the shape of an object with the apparatus of FIG. 1.

The projection grating Vs is projected onto the object V as shown in FIG. 3, and the observation grating Is is observed in the observation plane I. How to determine the shape of object V is as followed. This procedure is to select one grating point p from among the observation grating points P and to find the coordinates of the projection grating point x corresponding to the grating point p. If the coordinates of all projection grating points X corresponding to the grating points P are determined, then it is possible to know the outer configuration or the shape of the object V. This procedure will be explained below in more detail.

First, attention is invited to the one grating point p selected among the observation grating points P. A straight line m connects the grating point p to the focal point F. Since the coordinates of the grating point p and those of the focal point F are known, an equation for the straight line m is also obtained. From the above-mentioned observation requirements it is evident that the projection grating point x corresponding to the grating point p exists on the straight line m.

Figure 4:
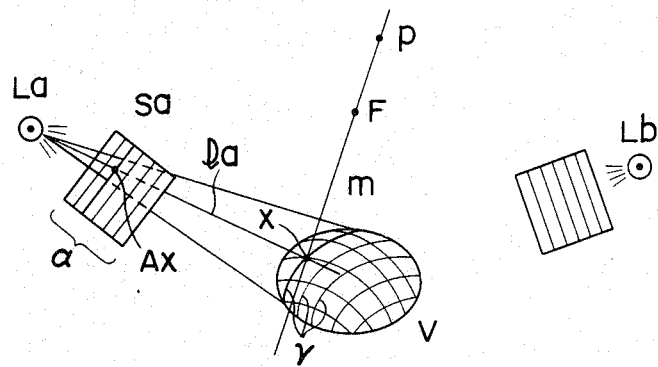

In FIG. 4, a light ray emitted from the light source La to the projection grating point x is a straight line la with a point Ax on which the straight line la intersects the slide Sa. Since the coordinates of the point Ax is unknown, an equation for the straight line la is unknown. If, however, the coordinates of the point Ax corresponding to the grating point x can be obtained, then the equation representing the straight line la is obtained and, thus, the coordinates of the projection grating x on the object can be obtained as an intersection of the known straight line m with the straight line la.

The procedure of finding the coordinates of the point Ax corresponding to the grating point x will is the following.

As seen in FIG. 4, since the grating point x exists on projection line γ formed by the projection of slit lines α, it is evident that point Ax is present on any one of slit the lines α. In this connection, note that, since the corresponding relation of slit line α to projection line γ is uncertain, it is not possible to specifically determine which slit lines α the point Ax is present on.

The following is a general approach to the evaluation of the point Ax on the slit lines α.

Figure 5:
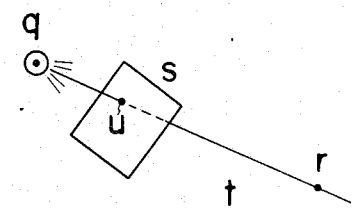
FIGS. 5, 6A and 6B are views for supplementing the above-mentioned explanation.

That is, the coordinates of a light source or a light emitting point q and the surface S in FIG. 5 are assumed to be unknown. The coordinates of a point u in the surface S formed by a light ray t reaching any arbitrary point r from the light source q will be obtained. Now suppose that there is a known straight line v passing through the point r as shown in FIGS. 6A and 6B.

Figure 6A:
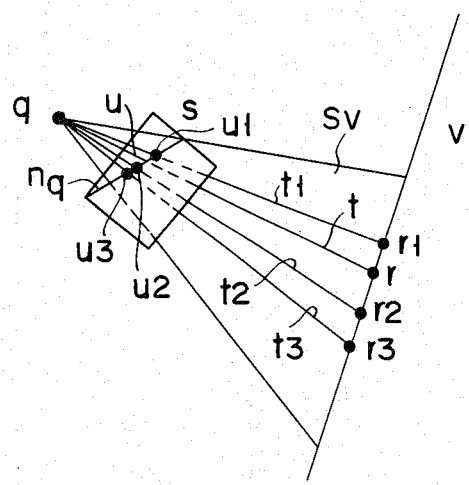
Figure 6B:
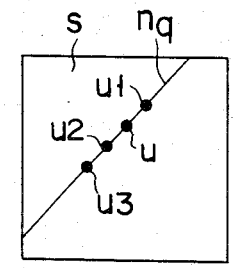

In this case, it is better to find an epipolar line nq on the surface S with respect to the straight line v as shown in FIG. 6. The epipolar line nq is a crossing line between the surface S and the plane Sv which contains the light source q and the straight line v. As evident in FIGS. 6A and 6B, the intersections (u1, u2, u3, ...) on which light rays (t1, t2, t3, ...) directed to the points (r1, r2, r3, ...) on the straight line v intersect the surface S are all present on the epipolar line nq.

Figure 7A:
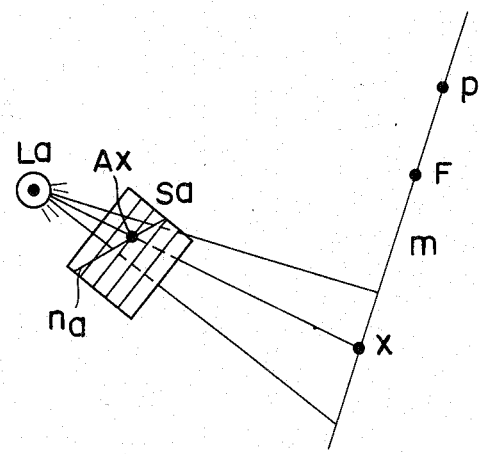

This procedure, if applied to the problem of finding a point Ax in FIG. 4, is as shown in FIG. 7A. In the measuring apparatus of this invention, in FIGS. 7A and 7B, the light source La, the slide Sa and the grating point x correspond to the light source q in FIG. 6, the plane S in FIG. 6 and the point r, respectively. As a straight line corresponding to the straight line v in FIG. 6, there exists a known straight line m connecting the observation grating point p and the focal point F. If the epipolar line na is found on the slide Sa with respect to the straight line m, the point Ax corresponding to the grating point x exists on the epipolar line na.

Figure 7B:
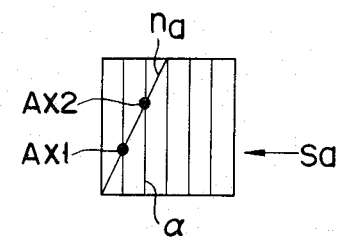
Figure 8:
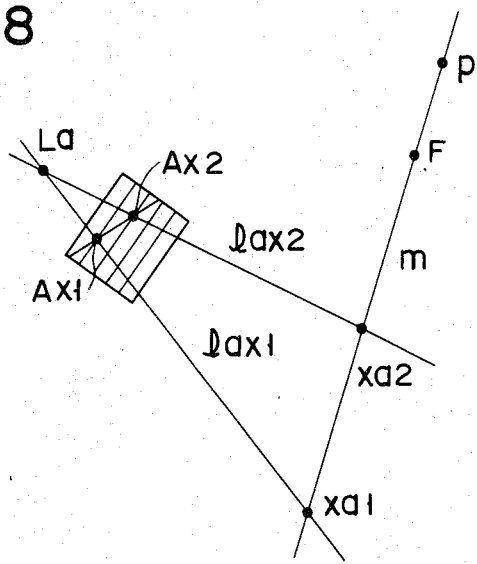

It will be found that, as seen in FIG. 7B, the point Ax is present on the intersection (Ax1 or Ax2) between the epipolar line na and the slit lines α, because it is known that the point Ax exists on the epipolar line na, and that the point Ax exists on one of the slit lines α. These points Ax1 and Ax2 are candidate points of the true point Ax. Either of the candidate points is the true point Ax. In practice, the slide Sa is large and two or more such points an exist, but an explanation will be continued in connection with the two points. The same thing is also true with the point Bx.

With the candidate points of the point Ax in mind, straight lines lax1 and lax2 are found which are given by connecting the light source La and the candidate points Ax1 and Ax2, respectively. If the intersections xa1 and xa2 on the straight line m formed by the straight lines lax1 and lax2 are found, the intersections xa1 and xa2 are the candidate points for the grating point x and, in this case, either of these points is the true grating point x.

Candidate points xa1 and xa2 corresponding to the observation grating point p are found for the grating point x through the computation based on the layout used with reference to FIGS. 4 to 8. Although the above-mentioned explanation is restricted to with the light projector A, it is equally applied to with the light projector B.

Also in the case of light projector B, the same computation and layout are employed with respect to the grating points p which are the same as the observation grating points p. FIGS. 9 and 10 correspond to FIGS. 7A, 7B and 8. In this connection it is added that, since there are four candidate points (Bx1, Bx2, Bx3, Bx4) of the grating point Bx, there are also four candidate points (xb1, xb2, xb3, xb4) of the grating point x.

Figure 11:
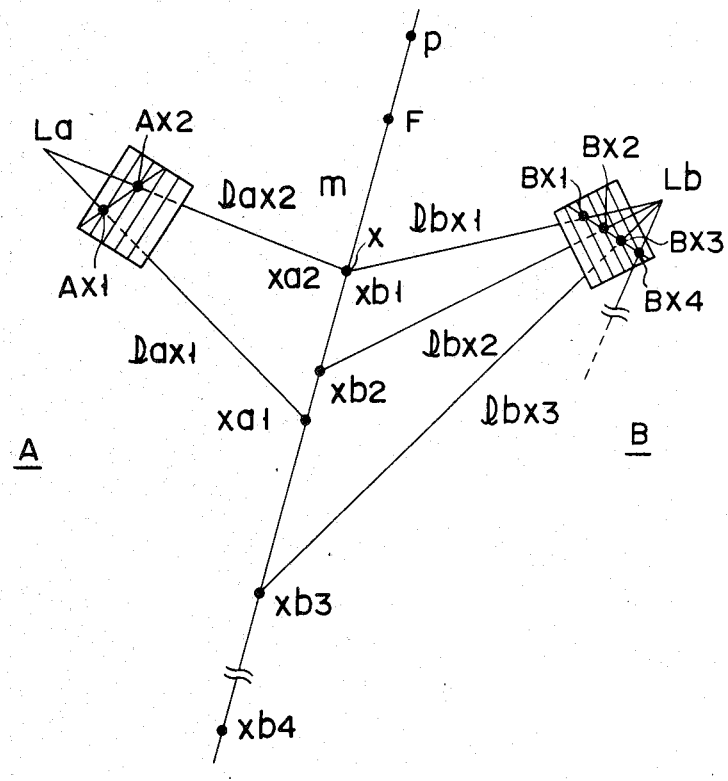

In this way, the candidate points of the grating point x are obtained with both of the light projectors A and B. Here, the true grating point x is one candidate point obtained with the light projector A and, at the same time, one candidate point obtained with the light projector B, as shown in FIG. 11. FIG. 11 shows, in the same layout, candidate the points xa1 and xa2 obtained on the side of the light projector A, and the candidate points xb1, xb2, xb3 and xb4 obtained on the side of the light projector B. In FIG. 11 it can be seen that the candidate points xa2 and xb1 fall on the same point. The true grating point x is the point xa2 or xb1.

The coordinates of the grating point x on the object V, corresponding to the observation grating point p, are obtained through the above-mentioned procedure. If all the grating points x on the object V corresponding to all the observation grating points p are obtained through the above-mentioned procedure, it is possible to measure the external configuration or the shape of the object. In this case, the more grating points x are provided, the higher accuracy of the measurement. In order to increase the number of grating points x, the projection grating Vs must comprise more slit lines α and β arranged densely. However, it is not necessary to compute all the grating points X on the object in with the above-mentioned procedure. The above-mentioned procedure is employed to determine the coordinates of only the grating points which need to be obtained or evaluated to measure the shape of object.

Basic Procedure II

In FIG. 11, the candidates point obtained with the light projector A and the candidate points obtained with the light projector B do not fall on one point, depending upon the positional relation of the respective light projectors as well as the choice of the grating point p. That is, a plurality of the coincidence points may exist as shown in FIG. 12A. In FIG. 12A, the procedure comprises selecting a certain observation grating point py and evaluating a projection grating point y corresponding to the selected observation grating point. In the light projector A, candidate points Ay1 and Ay2 of a point Ay are evaluated, and candidate points ya1 and ya2 of the grating point y are obtained from the candidate point Ay1 and Ay2. In the light projector B, candidate points yb1, yb2 and yb3 are evaluated and, in this case, two coincidence points y1 and y2 are obtained, failing to determine which one of the points y1 and y2 is the true projection grating point y, even if the procedure I is used. In this case, the true grating point y is determined as will be explained below.

The method is based on the concept that, in order to find a true grating point y, it suffices to determine which one of the candidate points Ay1 and Ay2 of the point Ay shown in FIGS. 12A and 12B is the true point Ay.

In practice, a grating point pz different from the grating point py in observation plane I in FIG. 12C is selected from the grating points on the same observation line λ on which the grating point py is present. Also a grating point z on the target object corresponding to the point py is found by using the above-mentioned procedure. If it is not possible to determine a true grating point z corresponding to the grating point pz relative to the grating point py due to such a positional relation as shown in FIG. 12A, another grating point pz' is selected from the grating points on the same observation line λ, on which the grating point py is present, and the true grating point z' on the object which corresponds to grating point pz' is formed. Here, explanation will be continued on the assumption that the true grating point z corresponding to the grating point pz has been found.

Since the true projection grating point z corresponding to the observation grating point pz is found, a true point Az corresponding to the grating point pz is also determined. From this it is found that the slit line αz containing the point Az, the projection line γz and the observation line λz have a specific relation.

As the observation grating points pz and py are located on the same observation line λz, the projection grating point y corresponding to the observation grating point py presents on the projection line γz, and the point Ay presents on the slit line αz, as shown in FIG. 12(C). If the slit line αz containing the point Ay is specified, as shown in FIG. 12(D), the true point Ay corresponding to the grating point py is determined as being on the slit line containing αz, that is, it is determined as being the point Ay2. In FIG. 12(A), therefore, the point ya2 (or y1) found with the use of the true point Ay2 is the true grating point y.

Precedure III

Procedure II has been explained as being applied to the particular case where, from the positional relation as shown in FIG. 12A, it is not possible to determine a true grating point y by basic procedure I. When procedure III is applied to an ordinary case as explained below, measurement can be carried out more efficiently than that of the procedures I and II. In a special case to which the precedure III is applied and in which all the grating points on the projection line on the object are measured, the measurement can be much more effectively carried out.

Figure 13A:
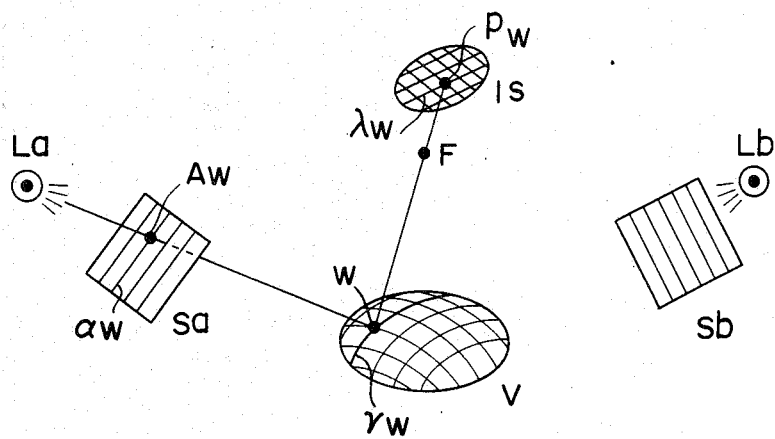
FIGS. 13A, 13B, 13C and 13D are views for explaining the third procedure for measuring the shape of the object with the apparatus of FIG. 1.

For a given observation grating point pw, as shown in FIG. 13A, a corresponding true grating point w and a corresponding point Aw on the slide Sa are evaluated by the procedure I or II. At this time, the observation line λw containing the observation point pw, the projection line γw containing a grating point w and the slit line αw containing a point Aw are determined to be corresponding true lines.

Figure 13B:
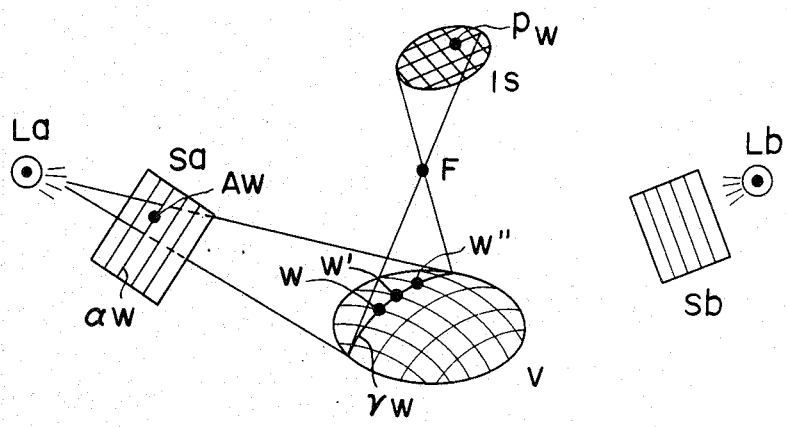
Figure 13C:
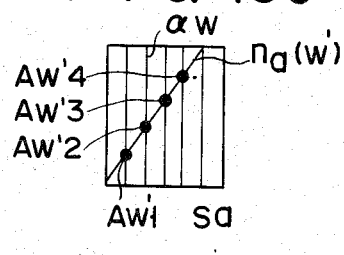

Thereafter, as shown in FIG. 13B, the coordinates of the grating points w', w", . . . on the grating line γw can be readily determined, taking advantage of the fact that the corresponding points, Aw' and Aw", (not shown) are also located on the slit line αw. That is, when the true point Aw' corresponding to the grating point w' is to be obtained, even if a plurality of the candidate points (Aw'1, Aw'2, Aw'3, Aw'4) are present for the point Aw', point Aw'2 on the slit line αw can be readily determined to be the true corresponding point Aw'. Thus, the true grating point w' can be obtained using the point Aw2.

Figure 13D:
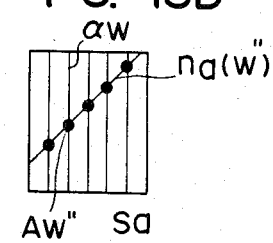

The coordinates of the grating point w" can be also determined, as shown in FIG. 13D, by the same procedure.

Once the slit line, the projection line and the observation line which are in a corresponding relation can be determined, the space coordinates of the projection grating point x can be determined with projection light A. This procedure also permits the use of another light projector B. As is evident from the above explanation, this procedure comprised finding, with respect to one grating point on the target object, a straight line containing the focals point F and a corresponding projection point and a straight line containing the grating point to which light beams from light projectors A and B are directed, and determining the coordiantes of the projection grating point as in intersection of these straight lines. This can be called a typical computation method for the measuring apparatus of this invention.

The projection line is segmented as a set of sectors, when object has projections or recesses in its surface is irregularly formed. In this case, with the respective sectors taken as entirely independent projection lines, the above-mentioned procedure can be employed for the respective sectors.

Where it is ovserved that the target object has an irregular surface, the relation between a set of slit, projection and observation lines is determined in accordance with the relation and in the procedure I or II. The adjacent lines on the object can be automatically determined using the above relation, and another lines can be also determined one after another. In this method, however, it is assumed that the adjacent lines on the object are projected as such. Thus, care must be taken with respect to the case in which the object has sharp troughs on it s surface and this assumption does not hold.

Basic Procedure IV (Steps Using Computer)

When the shape of the object is to be measured using a computer, computation can be carried out in accordance with the steps of the procedure I, II or III. In practice, however, it is convenient to follow the steps as set out below. The initial some steps are exactly the same as explained with reference to FIGS. 1 to 7B and 9A and 9B, but the subsequent steps are different. That is, in the above-mentioned basic procedure, the candidate points of the grating point x are obtained without determining true points Ax and Bx. Here, a pair of true points Ax and Bx are determined from among the candidate points of the points Ax and Bx, and then the true grating point x is obtained as explained below.

Figure 9A:
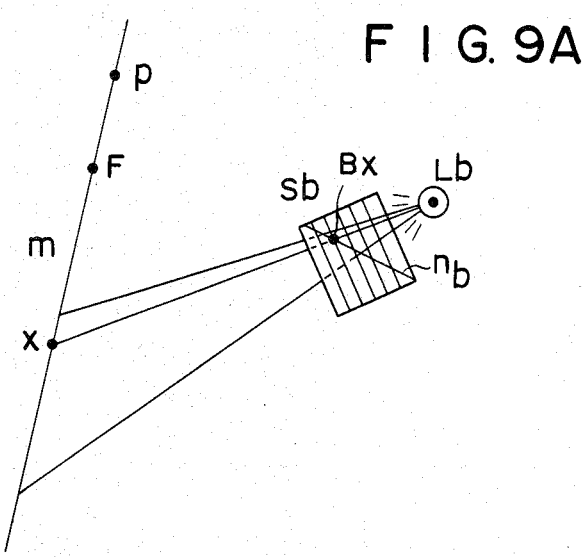
Figure 9B:
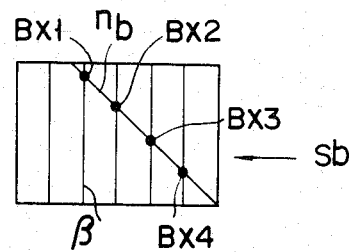
Figure 10:
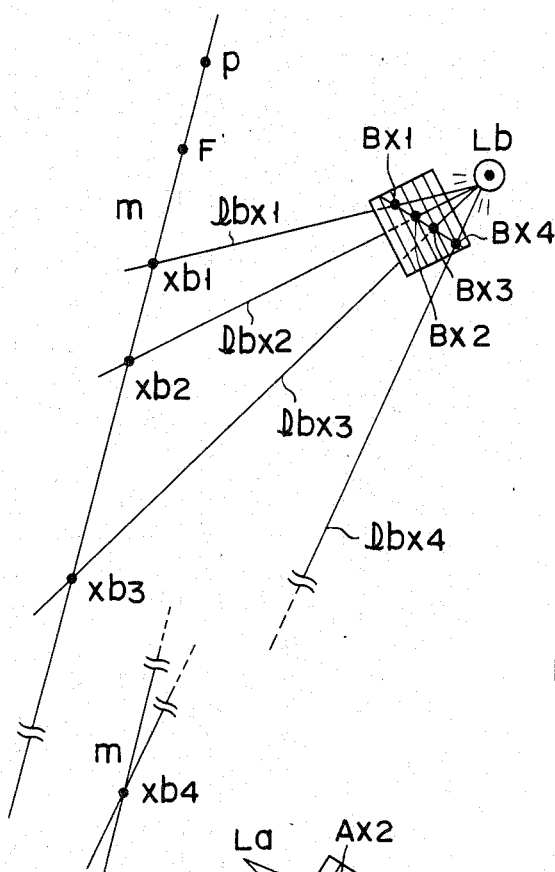

That is, cndidate points Ax1 and Ax2 of the point Ax are found in the same way as explained in connection with FIGS. 7A and 7B, and with respect to the point Bx candidate points Bx1, Bx2, Bx3 and Bx4 are found as shown in FIGS. 9A and 9B.

Figure 14A:
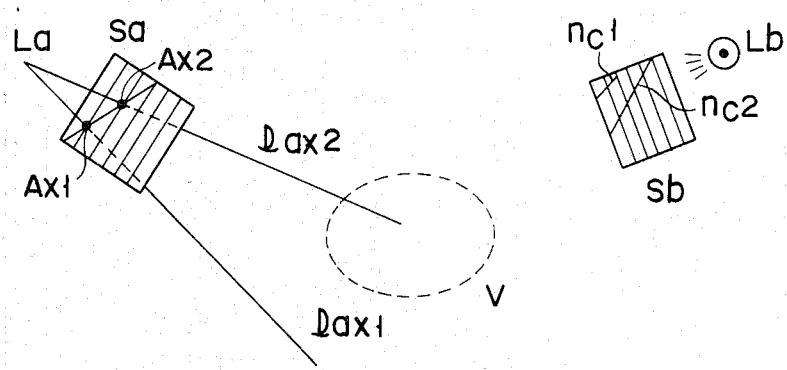
FIGS. 14A, 14B, 14C, 14D, 15A, 15B, 15C and 15D are views for explaining the fourth procedure for measuring the shape of the object with the apparatus of FIG. 1, while using a computer.
Figure 14B:
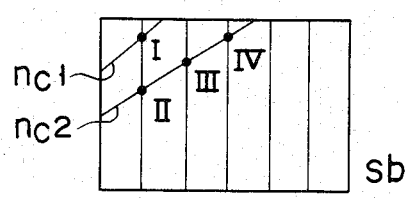
Figure 14C:
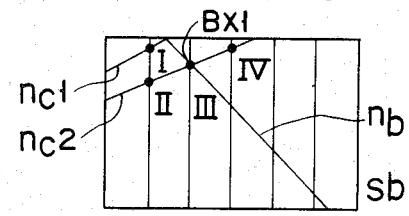
Figure 14D:
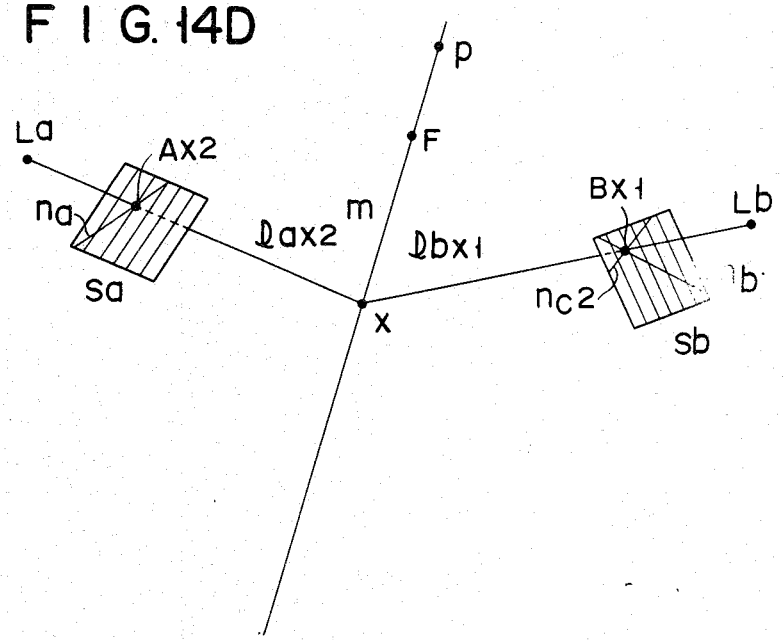

Then, as shown in FIG. 14A, straight lines lax1 and lax2 are obtained using the candidate point Ax1 and Ax2 of the point Ax. Then, with these lines lax1 and lax2 regarded as the straight line m as shown in FIG. 9A, epipolar lines nc1 and nc2 are obtained on the slide Sb. Epipolar lines nc1 and nc2 are the projection lines formed by straight lines lax1 and lax2, respectively. Here, a true straight line of the straight lines lax1 and lax2 should contain the grating point x. Assuming that the straight line lax1 is a true straight line lax, an intersection I of the epipolar line cl and the slit line β is the true point Vx as shown in FIG. 14(B). If the straight line lax2 is the true straight line lax, then one of the intersections (II, III, IV) of the epipolar line nc2 with the slit lines β as shown in FIG. 14B is a true point Bx. It has been found that, as shown in FIG. 9B, the true point Bx is one of the candidate points Bx1, Bx2, Bx3, Bx4. As evident in FIGS. 9 and 14, the true point Bx is the point where one of the candidate points Bx1, Bx2, Bx3 and Bx4 conincides with one of the intresection (I, II, III, IV) as shown in Fig. 14C. In FIG. 14C, the candidate point Bx1 (intersection III) is the true point Bx, since the intersection III of the epipolar line nc2 with the slit lines β conincides with the candidate point Bx1. Since the corresponding true point Ax is determined to be point Ax2 on the straight line lax2 on the basis of the epipolar line nc2 as shown in FIG. 14, true points Ax, Bx in a pair are found to be a combination of points Ax2 and Bx1.

Once the pair of points Ax, Bx is obtained in this way, the coordinates of the grating point x can be obtained as an intersection of lines lax2 and lbx1, of lines lax2 and m or of lines lbx1 and m.

Figure 15A:
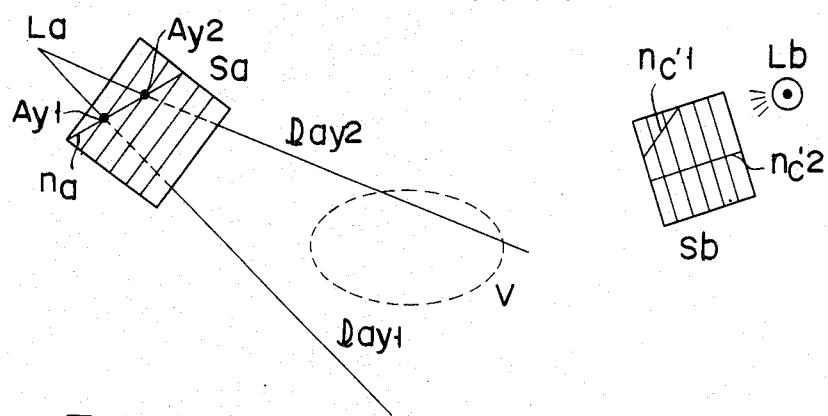
Figure 15B:
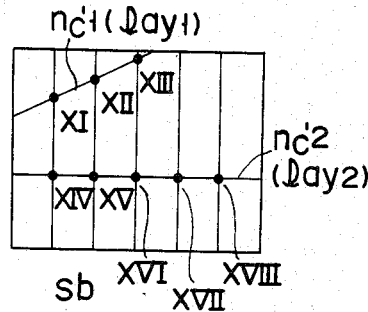
Figure 15C:
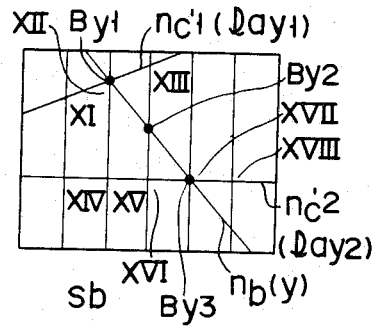
Figure 15D:
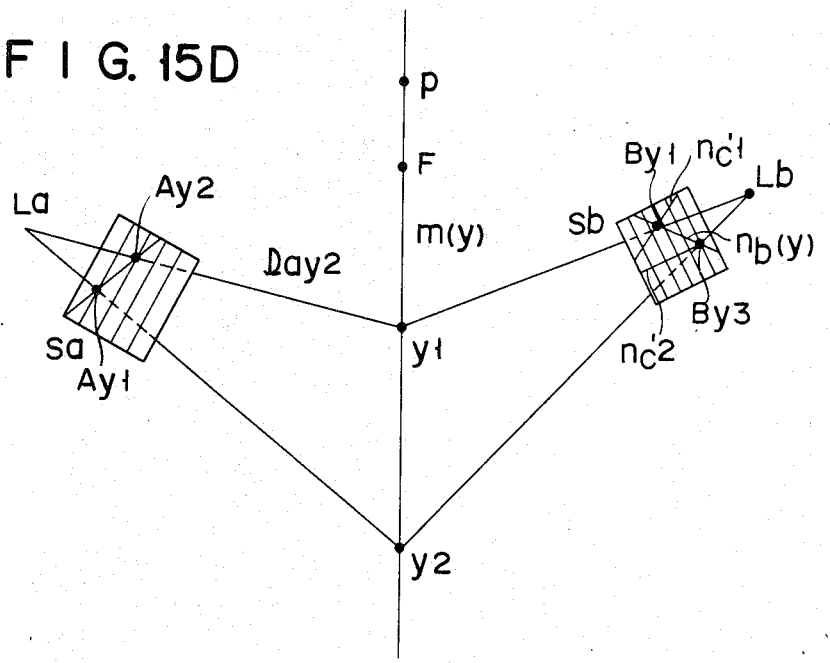

Even in accordance with this procedure, if the arrangement of the measurement system happens to be as shown in FIG. 12A, it is not possible to determine one true pair of points Ay, By and thus true grating point y. That is, in the arrangements as shown in FIG. 12A, the arrangements of FIGS. 14A, 14B and 14C correspond to those of FIGS. 15A, 15B and 15C. One pair of Ay1 and By3 and another pair of Ay2 and By1 exist with respect to the pair of points Ay and By as seen in FIG. 15D, failing to determine a true pair. If, however, true point Ay (or By) is determined through the procedure as explained with respect to FIG. 12, it is possible to obtain the true grating point y. To this conputer-assisted procedure, procedure III can apply so as to readily obtain the coordinates of a number of grating points X.

Figure 16:
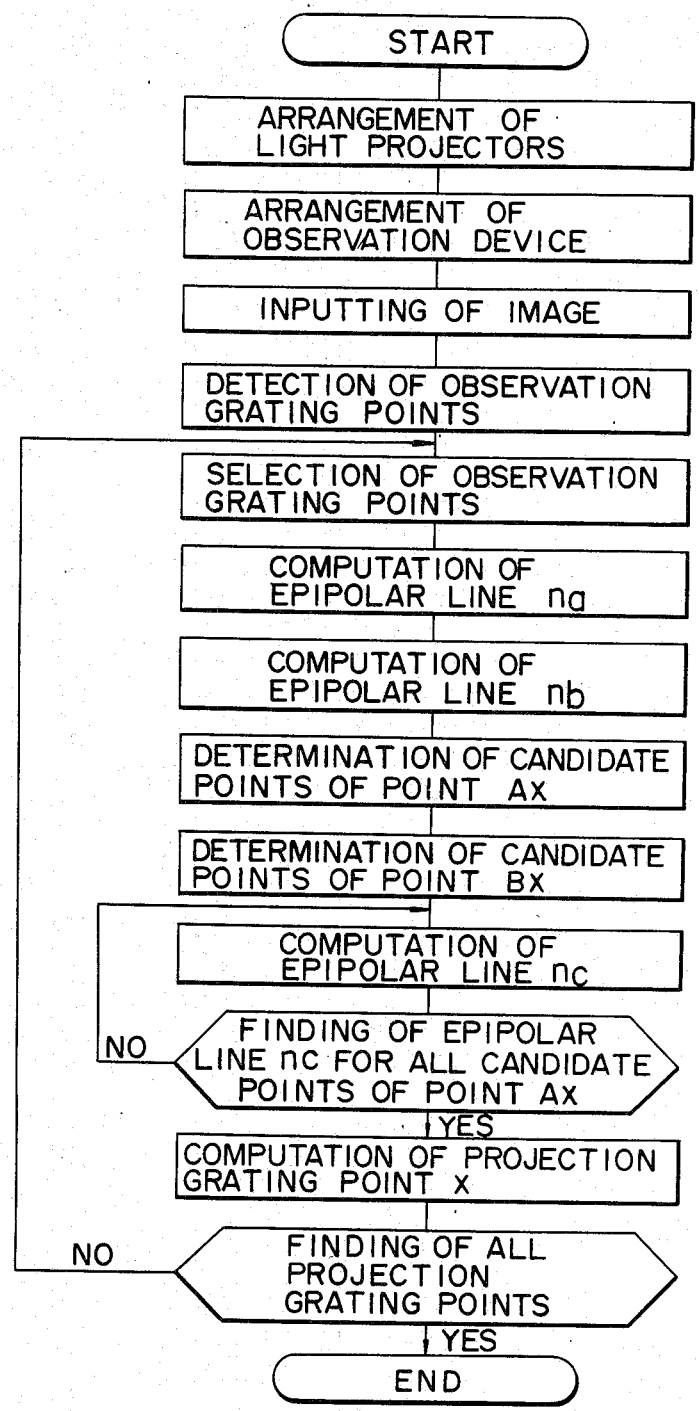
FIG. 16 is a flow chart showing the calculation steps for running the above-mentioned procedure with an aid of a computer.

The steps of the computer-assisted procedure will be briefly explained below with reference to a flow chart in FIG. 16.

—Start—

1 . . . Arrangement of Light Projectors:

Light projectores A and B are arranged such projection grating Vs is projected on an object V with the respective projection lines crossed.

2 . . . Arrangement of Observation Device:

The observation device is located in such a position as to permit the grating Vs to be adequately observed on the object V.

3 ... Inputting of Image:

The grating Vs on the target object is observed by the observation device and a corresponding image (observation grating Is) is imput to the measuring apparatus.

4 ... Detection of Observation Grating Points:

The coordinates of all grating points P in observation grating Is are detected.

5 ... Selection of Observation Grating Points:

One observation grating point p is selected from among observation grating points P.

6 ... Computation of Epipolar Line na:

This step finds an intersection line between the slide Sa and the plane containing the observation grating point p, the focal point F and the light source La. The inter section line represents epipolar line na.

7 ... Computation of Epipolar Line nb:

Epipolar line nb is obtained with respect to the slide Sb in the same procedure as epipolar line na.

8 ... Determination of Candidate Points of Point Ax:

The candidate points are intersections of the epipolar line na and the slit line on the slide Sa.

9 ... Determination of Candidate points of Point Bx:

The candidate points of point Bx are found in the same way as those of point Ax.

10 ... Computation of Epipolar Line:

This step finds a straight line laxi corresponding to Axi which are the candidate points of the point Ax, and then an intersection line between the slide Sb and the plane containing the straight line laxi and light source Lb. The intersection line represents an epipolar line nc. Step 10 is repeated with respect to all the candidate points of point Ax.

11 ... Computation of Projection Grating Point x:

From among the intersections of the slit line and the straight line nc obtained in step 10, step 11finds a coincidence point (a true point Bx) which coincides with the candidate point for the point Bx. Then, projection grating point x is obtained as explained above. The steps 5 to 11 are repeated for all the grating points of observation grating Is.

—End—

The basic procedure is different from the computer-aided procedure in that the basic procedure is to search for the grating point x on the straight line m and the computer-aided procedure is to search for the point Ax on the slide Sa and for the point Bx on the slide Sb, whereby grating point x is obtaines. However, there is no essential difference between the two as in appreciated in the drawings.

Utilization of Colors

In the above-mentioned embodiment, slit lines $\alpha$ on the slide Sa were colored in one color (ex. yellow) and, similarly, slit lines $\beta$ on slide Sb were colored in one color. If, however, the slit lines on the slide are colored with various colors (for example, red, green and blue), the coordinates of grating point X can be determined more effectively than before.

The apparatus of this invention will be explained below in connection with the use of the various colors, i.e., three colors: red, green and blue.

First, with slit lines $\alpha$ ($\alpha 1$, $\alpha 2$, $\alpha 3$, $\alpha 4$, $\alpha 5$, $\alpha 6$, $\alpha 7$, ...) sequentially colored in colors, such as red, green, blue; red, green, blue; ..., projection lines $\gamma$ ($\gamma 1$, $\gamma 2$, $\gamma 3$, $\gamma 4$, $\gamma 5$, $\gamma 6$, $\gamma 7$, ...) are projected on an object V in that order of colors. Similarly, with slit lines $\beta$ ($\beta 1$, $\beta 2$, $\beta 3$, ...) sequentially colored with a sets of colors, such as red, green, blue ..., projection lines $\delta$ ($\delta 1$, $\delta 2$, $\delta 3$, ...) are projected on te object V in that order of colors. This is one example and the array of colors may be of a random type.

In this way, six kinds of colors are involved in grating points X on projection lines $\gamma$ and $\delta$ colored in red, blue and green. That is, a magenta grating point is obtained at the grating point x where a red projection line $\gamma$ intersects witha blue projection line $\delta$. Similarly, a yellow grating point is obtained in a combination of red and green and a cyan grating point is obtained in a combination of blue and green. Since, in addition to such three combination colors, the original three colors, red, blue, green, are also obtained in the combination of the same color, providing six kinds of colors in all.

Here, let if be assumed that the observation device can identify the respective colors of the projection line $\gamma$ and $\delta$ and the grating point X on the object. Now suppose that the coordinates of the projection grating point x on the target object corresponding to any one grating point p are determined as in the basic procedure, and magenta grating point x is observed with respect to grating point p. Needless to say, point Ax corresponding to the grating point x is located on one of the red slit lines on the slide Sa and the point Bx corresponding to the grating point x is located on one of the blue slit lines on slide Sb.

In this method, with attention paid to a specific color slit line of the respective slit lines on the slides Sa and Sb, it is only necessary to select the candidate points of points Ax and Bx, permitting a lesser number of candidate points for points A, B as compared with the earlier basic procedure. As a result, it is possible to reduce an amount of computation for obtaining the candidate points with respect to the grating point x.

If the slit lines are made denser so as to improve the accuracy with which measurement is made, the arrangement as shown in FIG. 12 happens in a high probability. In the arrangement shown in FIG. 12, more computation steps are required to obtain the projection grating point, hindering the effective meausrement of teh object shape. In the coloring method, with attention paid to a certain grating point x, the slit lines associated with grating point x are part of all the slit lines, which is substantially equivalent to the case where the slit lines are sparsely formed on the slide surface. Even if the slit lines are densely formed on the slide surface, there is less chance that the arrangement as shown in FIG. 12 takes place.

What is claimed is:

1. An apparatus for measuring the three-dimensional shape of a solid object, comprising:
    a first light projector comprised of a first light source and a first slide having a first slit line array and adapted to, when the first light source is energized, permit light rays to reach, through the first slide, the surface of an object at an arbitrary place to form a projection line array of the first slit line array on the surface of the object:
    a second light projector comprised of a second light source and a second slide having a second slit line array and adapted to, when the second light source is energized, permit light rays to reach, through the second slide, the surface of the object to form a projection line array of the second slit line array, said first and second light projectors permitting a projection grating to be formed on the surface of the object by an intersection of the projection line array of the first slit line array with the projection array of the second slit line array;

an observation device adapted to focus said projection grating to be formed on an observation plane through a focal point; and means for determining space coordinates of a grating point on the projection grating on the surface of the object corresponding to any arbitrary grating point in the observation grating, said means determining a first straight line containing said one grating point is said observation grating and said focal point, a second straight line containing said one grating point and said first light source and a third straight line containing said one grating point and said second light source, said means determining the coordinates of an intersectionn of at least two of said first, second and third straight lines as space coordinates of said one grating point on said projection grating.

2. An apparatus according to claim 1, in which said first and second slit lines each contain slit lines arranged in an equidistant, regular fashion.

3. An apparatus according to claim 2, in which said space coordinate determining means comprises:

first means for determining an epipolar line for said straight line, the epipolar line extending on the slide of said first light projector, second means for determining a set of intersections formed by said epipolar line and said first slit lines, third means for determining a set of straight lines containing the respective intersections and said first light source, and means for determining space coordinates of a set of candidate points on the basis of the intersection of said set of straight lines and said first straight line;

first means for determining an epipolar line for said first straight line with the second light projector, second mens for determining a set of intersections formed by said epipolar line and said second slit lines, third means for determining a set of straight lines containing the respective intersections and said second light source, and means for determining space coordinates of a set of second candidate points on the basis of the intersection of said set of straight lines and said first straight line; and means for finding a coincidence between the first candidate points and said second candidate points and for determining space coordinates of said coincidence point as the space coordinates of said one grating point of said projection grating.

4. An apparatus according to claim 1 in which said space coordinate determining means comprises:

first means for determining an epipolar line for said first straight line, the epipolar line extending on the slide off said first light projector, second means for determining a set of intersections formed by said epipolar line and said first slit lines, third means for determining a set of straight lines containing the respective intersections and said first light source, and means for determining space coordinates of a set of candidate points on the basis of the intersections of said set of straight lines and said first straight line;

first means for determining an epipolar line for said first straight line with the second light projector, second means for determining a set of intersections formed by said epipolar line and said second slit lines, third means for determining a set of straight lines containing the respective intersections and said second light source, and means for determining space coordinates of a set of second candidate points on the basis of the intersection of said set of straight lines and said first straight line; and means for finding a coincidence between the first candidate points and said second candidate points and for determining space coordinates of said coincidence point as the space coordinates of said one grating point of said projection grating.

5. An apparatus according to claim 4, in which at least one of said first and second slit lines is colored in a color or colors.

6. An apparatus according to claim 3, in which at least one of siad first and second slit lines is colored in a color or colors.

7. An apparatus according to claim 2, in which said space coordinate determining means comprises:

first means for determining first and second epipolar lines for said straight line with said first and second light projectors respectively;

second means for determining a set of intersections formed by said epipolar lines and said slit lines of first and second slides;

third means for determining straight lines containing said intersections of first epipolar line and first slit lines and said first light source;

fourth means for determining epipolar lines for the lines determined by said third means with said second light projector;

fifth means for determining intersections between said epipolar lines and said second slit line; and means for determining space coordinates of one grating point of said projection grating on the basis of the space coordinates of a coincidence point obtained by the intersections which is determined by said fifth means and the set of intersections determined by said second means.

8. An apparatus according to claim 7, in which said space coordinate determining means operates using a computer.

9. An apparatus according to claim 8, in which at least one of said first and second slit lines is colored in a color or colors.

10. An apparatus according to claim 7, in which at least one of said first and second slit lines is colored in a color or colors.

11. An apparatus according to claim 2, in which said space coordinate determining means operates using a computer.

12. An apparatus according to claim 11, in which at least one of said first and second slit lines is colored in a color or colors.

13. An apparatus according to claim 2, in which at least one of said first and second slit lines is colored in a color or colors.

14. An apparatus according to claim 3, in which said space coordinate determining means operates using a computer.

15. An apparatus according to claim 4, in which said space coordinate determining means operates using a computer.

16. An apparatus according to claim 15, in which at least one of said first and second slit lines is colored in a color or colors.

17. An apparatus according to claim 4, in which at least one of said first and second slit lines is colored in a color or colors.

18. An apparatus according to claim 1, in which said space coordinate determining means comprises:
- first means for determining first and second epipolar lines for said straight line with said first and second light projectors respectively;
- second means for determining a set of intersections formed by said epipolar lines and said slit lines of first and second slides;
- third means for determining straight lines containing said intersections of first epipolar line and first slit lines and said first light source;
- fourth means for determining epipolar lines for the lines determined by said third means with said second light projector;
- fifth means for determining intersections between said epipolar lines and said second slit line; and
- means for determining space coordinates of one grating point of said projection grating on the basis of the space coordinates of a coincidence point obtained by the intersections which is determined by said fifth means and the set of intersections determined by said second means.

19. An apparatus according to claim 18, in which said space coordinate determining means operates using a computer.

20. An apparatus according to claim 19, in which at least one of said first and second slit lines is colored in a color or colors.

21. An apparatus according to claim 18, in which at least one of said first and second slit lines is colored in a color or colors.

22. An apparatus according to claim 1, in which said space coordinate determining means operates using a computer.

23. An apparatus according to claim 22, in which at least one of said first and second slit lines is colored in a color or colors.

24. An apparatus according to claim 1, in which at least one of said first and second slit lines is colored in a color or colors.

* * * * *

UNITED STATES PATENT AND TRADEMARK OFFICE
CERTIFICATE OF CORRECTION

PATENT NO. : 4,668,094

DATED : May 26, 1987

INVENTOR(S) : Goro Matsumoto et al.

It is certified that error appears in the above—identified patent and that said Letters Patent is hereby corrected as shown below:

On the title page, please change the name of the Assignee to read --Goro Matsumoto, Sapporo, Japan; Hitachi Medical Corporation, Tokyo, Japan--.

Column 11, line 13, delete "is" and insert --in--.

Column 11, line 27, after "said" insert --first--.

Column 11, lines 35-36, delete "intersection" and insert --intersections--.

Column 11, line 40, delete "mens" and insert --means--.

Column 12, line 13, delete "4" and insert --14--.

Column 12, line 18, delete "siad" and insert --said--.

Signed and Sealed this

Thirteenth Day of October, 1987

*Attest:*

DONALD J. QUIGG

*Attesting Officer*   *Commissioner of Patents and Trademarks*